(12) United States Patent
Kuwabara et al.

(10) Patent No.: US 8,287,114 B2
(45) Date of Patent: Oct. 16, 2012

(54) AQUEOUS INK COMPOSITION AND IMAGE FORMING METHOD

(75) Inventors: Tomoko Kuwabara, Kanagawa (JP); Takahiro Ishizuka, Kanagawa (JP); Yasufumi Ooishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 239 days.

(21) Appl. No.: 12/874,240

(22) Filed: Sep. 2, 2010

(65) Prior Publication Data

US 2011/0057984 A1    Mar. 10, 2011

(30) Foreign Application Priority Data

Sep. 8, 2009  (JP) ................................. 2009-207189

(51) Int. Cl.
*G01D 11/00* (2006.01)
(52) U.S. Cl. ...................................................... 347/100
(58) Field of Classification Search .................... 347/20, 347/95, 96, 100; 106/31.6; 524/556, 560
See application file for complete search history.

(56) References Cited

U.S. PATENT DOCUMENTS

| 7,919,545 B2 * | 4/2011 | Shimohara et al. ........... 523/160 |
| 7,973,097 B2 * | 7/2011 | Nishiguchi et al. ........... 523/160 |

FOREIGN PATENT DOCUMENTS

| EP | 1555549 A | 7/2005 |
| EP | 1717282 A | 11/2006 |
| EP | 2166046 A | 3/2010 |
| JP | 2008-247940 A | 10/2008 |
| JP | 2009-084494 A | 4/2009 |
| WO | 2008/081996 A | 7/2008 |

\* cited by examiner

*Primary Examiner* — An Do
(74) *Attorney, Agent, or Firm* — Solaris Intellectual Property Group, PLLC

(57) ABSTRACT

An aqueous ink composition including a colorant, a polymer including a hydrophobic structural unit (a) represented by the following formula (1), a polymerization initiator, a polymerizable compound including an ethylenically unsaturated bond, and water:

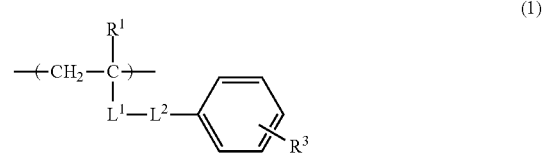

(1)

wherein, in formula (1), $R^1$ represents a hydrogen atom, a methyl group or a halogen atom; $L^1$ represents —COO—, —OCO—, —CONR$^2$—, —O—, or a substituted or unsubstituted phenylene group; $R^2$ represents a hydrogen atom or an alkyl group having 1 to 10 carbon atoms; $L^2$ represents a single bond or a divalent linking group having 1 to 30 carbon atoms; and $R^3$ represents a hydrogen atom, a hydroxy group, an alkyl group, an alkyloxy group, an aryl group, an arylalkyl group, an aryloxy group, an acyl group, a halogen atom, a cyano group, or a nitro group.

15 Claims, No Drawings

AQUEOUS INK COMPOSITION AND IMAGE FORMING METHOD

CROSS-REFERENCE TO RELATED APPLICATION

This application claims priority under 35 USC 119 from Japanese Patent Application No. 2009-207189 filed Sep. 8, 2009, the disclosure of which is incorporated by reference herein.

BACKGROUND OF THE INVENTION

1. Field of the Invention

The present invention relates to an aqueous ink composition and an image forming method.

2. Description of the Related Art

An aqueous active radiation-curable ink, i.e., an ink composition that contains water as the main medium and is curable upon irradiation with active radiation such as ultraviolet radiation, can be suitably used for image printing, pretreatment for imparting printing suitability to recording media, post-treatment such as protection or decoration of printed images, or the like. Further, since water is used as the main component, this type of ink composition is highly safe. In recent years, there is demand for forming a high quality image that cures at high sensitivity by using an aqueous active radiation-curable ink as an ink composition for inkjet recording.

However, an aqueous active radiation-curable type ink that satisfies stability over time, dischargeability or the like, which are necessary for ink in inkjet recording, and is capable of forming a cured film that exhibits excellent color saturation, print density, scratch resistance, fixability, marker resistance or the like, by irradiation with light, has yet to be achieved.

Use of various kinds of pigment dispersant polymers is known in terms of enhancing the properties of ink used for inkjet recording. For example, an ink in which a polymer having a benzene ring that is not directly linked to the main chain, as a pigment dispersant, is disclosed (see, for example, Japanese Patent Application Laid-Open (JP-A) No. 2009-84494), and this ink is said to exhibit excellent stability over time, dischargeability or the like. Furthermore, a crosslinkable composition in which a benzyl dimethyl ketal water-soluble photoinitiator is used and a styrene/acrylic acid/ethyl acrylate copolymer is used as a dispersant, is disclosed as an aqueous active radiation-curable ink (see, for example, JP-A No. 2008-247940), and this ink is said to exhibit high curing sensitivity.

However, since the ink described in JP-A No. 2009-84494 does not contain a polymerizable compound or the like and does not undergo a process such as photocuring, it may be difficult to say that the printed material obtained by using this ink has sufficient scratch resistance, fixability, marker resistance or the like.

Furthermore, the aqueous ink solution described in JP-A No. 2008-247940 may not exhibit sufficient ink stability, dischargeability or dispersibility, and the color saturation or print density of the cured film may not be satisfactory.

In view of the above, it is an object of the invention to provide an aqueous ink composition that is capable of forming a cured film that exhibits high print density, as well as excellent color saturation, scratch resistance, fixability and marker resistance. It is also an object of the invention to provide an image forming method in which this aqueous ink composition is used.

SUMMARY OF THE INVENTION

The present invention provides an aqueous ink composition including a colorant, a polymer including a hydrophobic structural unit (a) represented by the following formula (1), a polymerization initiator, a polymerizable compound including an ethylenically unsaturated bond, and water:

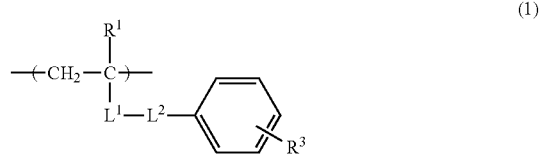

wherein, in formula (1), $R^1$ represents a hydrogen atom, a methyl group or a halogen atom; $L^1$ represents —COO—, —COO—, —CONR$^2$—, —O—, or a substituted or unsubstituted phenylene group; $R^2$ represents a hydrogen atom or an alkyl group having 1 to 10 carbon atoms; $L^2$ represents a single bond or a divalent linking group having 1 to 30 carbon atoms; and $R^3$ represents a hydrogen atom, a hydroxy group, an alkyl group, an alkyloxy group, an aryl group, an arylalkyl group, an aryloxy group, an acyl group, a halogen atom, a cyano group, or a nitro group.

DETAILED DESCRIPTION OF THE INVENTION

Aqueous Ink Composition

The aqueous ink composition according to the present invention includes at least one kind of colorant (A); at least one kind of polymer (B) that contains a hydrophobic structural unit (a) represented by the following formula (1); at least one kind of polymerization initiator (c); at least one polymerizable compound (D) having an ethylenically unsaturated bond; and water (E). The aqueous ink composition according to the present invention may further include other components, as necessary.

By using the aqueous ink composition according to the invention, a cured film, which exhibits high print density, as well as excellent color saturation, scratch resistance, fixability and marker resistance, may be formed by, for example, light irradiation.

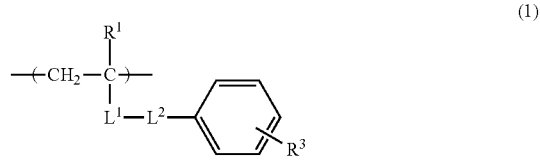

In formula (1), $R^1$ represents a hydrogen atom, a methyl group or a halogen atom; $L^1$ represents —COO—, —COO—, —CONR$^2$—, —O—, or a substituted or unsubstituted phenylene group; $R^2$ represents a hydrogen atom or an alkyl group having 1 to 10 carbon atoms; $L^2$ represents a single bond or a divalent linking group having 1 to 30 carbon atoms; and $R^3$ represents a hydrogen atom, a hydroxy group, an alkyl group, an alkyloxy group, an aryl group, an arylalkyl group, an aryloxy group, an acyl group, a halogen atom, a cyano group, or a nitro group.

The aqueous ink composition of the invention may be used not only for forming a monochromatic image, but also for forming a full color image. In order to form a full color image, a combination of a magenta color ink, a cyan color ink and a yellow color ink may be used, and a black color ink may be further used for adjusting the color tone. Other than inks of yellow, magenta and cyan, inks of red, green, blue white and the like, and what is called spot color ink used in the field of printing (for example, colorless ink) are also applicable.

(A) Colorant

The aqueous ink composition according to the invention contains at least one kind of colorant.

In the invention, any known dyes, pigments and the like may be used as the colorant without any particular limitation. Among them, a colorant which is almost insoluble or sparingly soluble in water, is preferred in view of the coloring property of the ink. Specific examples of the colorant include various kinds of pigments, dispersion dyes, oil-soluble dyes, and coloring materials that form a J-aggregate. In view of light fastness, the colorant is more preferably a pigment.

The type of the pigment used in the invention is not particularly limited, and any conventionally known organic and inorganic pigments may be used.

Examples of the organic pigments include azo pigments, polycyclic pigments, dye chelates, nitro pigments, nitroso pigments and aniline black. Among these, azo pigments, polycyclic pigments and the like are more preferred. Examples of the azo pigments include azo lake pigments, insoluble azo pigments, condensed azo pigments and chelate azo pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments and quinophthalone pigments. Examples of the dye chelates include basic dye chelates and acidic dye chelates.

Examples of the inorganic pigments include titanium oxide, iron oxide, calcium carbonate, barium sulfate, aluminum hydroxide, barium yellow, cadmium red, chrome yellow and carbon black. Among these, carbon black is particularly preferred. Examples of the carbon black include those produced by a known method such as a contact method, a furnace method or a thermal method.

Specific examples of the pigment that may be used in the invention include the pigments described in paragraphs [0142] to [0145] of JP-A No. 2007-100071.

Among them, from the viewpoint of colorability and color tone, the pigment contained in a yellow color ink is preferably C.I. Pigment Yellow 74 (PY74), the pigment contained in a magenta color ink is preferably C.I. Pigment Red 122 (PR122), and the pigment contained in a cyan color ink is preferably C.I. Pigment Blue 15:3 (PB15:3). The pigment contained in a black color ink is preferably carbon black.

The content ratio of the pigment in the aqueous ink composition according to the invention may be appropriately adjusted according to purposes, but the content of the pure pigment fraction (not including a surface treating agent or a dispersant) is preferably in the range of from 0.3 to 10% by mass, based on the total amount of the aqueous ink composition. The content of the pigment also depends on the dispersed state of the pigment particles, but when the content of the pigment is roughly in the range of from 0.3 to 1% by mass, the ink composition may be used as an ink having a light color. When the content of the pigment is greater than the above range, the ink composition is used as an ink for general coloring applications.

(B) Polymer

The aqueous ink composition according to the invention contains at least one kind of polymer (B), and the polymer (B) contains at least one kind of hydrophobic structural unit (a) represented by the following formula (1).

The polymer (B) may be used as, for example, a dispersant for the colorant (preferably a pigment). By using the polymer (B) containing a particular structural unit, dispersibility of the pigment may be increased, and glossiness or color reproducibility of the cured film may be improved. Furthermore, stability of the aqueous ink composition may be maintained, thereby improving storability. When the aqueous ink composition according to the invention is applied to an inkjet method, adherence of the aqueous ink composition to nozzles may be suppressed, thereby improving dischargeability.

(a) Hydrophobic Structural Unit

The hydrophobic structural unit (a) represented by the following formula (1) has a structure that includes an aromatic ring, and this aromatic ring is bound to an atom that forms the main chain via a linking group. When the hydrophobic structural unit has a structure as described above, for example, an appropriate distance between the hydrophobic aromatic ring and a hydrophilic structural unit, which may be included in the polymer (B), may be maintained. As a result, it is presumed that it becomes easier to cause interaction between the polymer (B) and the colorant (A), and the polymer (B) is adsorbed to the colorant (A) more strongly, thereby further enhancing the dispersibility.

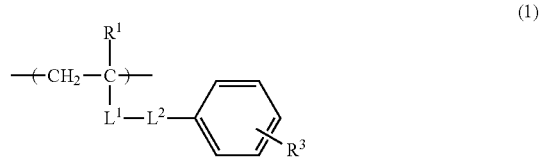

(1)

In the formula (1), $R^1$ represents a hydrogen atom, a methyl group or a halogen atom.

$L^1$ represents —COO—, —COO—, —CONR$^2$—, —O—, or a substituted or unsubstituted phenylene group. Here, for example, the expression "—COO—" indicates that the carbonyl carbon is positioned on the side of the main chain, while the alcoholic oxygen atom is positioned on the side of $L^2$. $R^2$ represents a hydrogen atom or an alkyl group having 1 to 10 carbon atoms.

$L^1$ according to the invention is preferably —COO— from the viewpoint of stability, storability and dischargeability.

$L^2$ represents a single bond or a divalent linking group having 1 to 30 carbon atoms, but from the viewpoint of stability, storability and dischargeability, $L^2$ is preferably a linking group having 2 to 25 carbon atoms, more preferably a linking group having 2 to 20 carbon atoms, and even more preferably a linking group having 2 to 12 carbon atoms. The divalent linking group represented by $L^2$ may be formed only from a saturated bond, or may include an unsaturated bond. Furthermore, the linking group may have a straight-chained structure or a branched structure, or may have a cyclic structure. The linking group may further include a substituent. In addition to carbon atoms, the linking group may also include a heteroatom selected from an oxygen atom, a nitrogen atom or a sulfur atom.

Specific examples of the divalent linking group represented by $L^2$ include an alkylene group and an oxyalkylene group, and an oxyalkylene group is preferred from the viewpoint of stability, storability and dischargeability.

$R^3$ represents a hydrogen atom, a hydroxy group, an alkyl group, an alkyloxy group, an aryl group, an arylalkyl group, an aryloxy group, an acyl group, a halogen atom, a cyano group, or a nitro group. The position of $R^3$ is not particularly limited, and may be any of the ortho-position, meta-position or para-position.

$R^3$ according to the invention is preferably a hydrogen atom, an alkyl group, an alkyloxy group, an aryl group, an arylalkyl group, an aryloxy group or an acyl group, from the viewpoint of stability, storability and dischargeability. $R^3$ is more preferably a hydrogen atom, an alkyl group having 1 to 10 carbon atoms, a methoxy group, an ethoxy group, a butoxy group, a phenyl group, a biphenyl group, a naphthyl group, a benzyl group, a phenoxy group, an acetyl group or a benzoyl group, even more preferably a hydrogen atom, a phenyl group, a benzyl group, a phenoxy group or a benzoyl group. $R^3$ is particularly preferably a hydrogen atom.

The hydrophobic structural units represented by the formula (1) is preferably a hydrophobic structural unit in which $R^1$ is a hydrogen atom or a methyl group, $L^1$ is —COO—, $L^2$ is a divalent linking group having 2 to 20 carbon atoms and $R^3$ is a hydrogen atom; more preferably a hydrophobic structural unit in which $R^1$ represents a hydrogen atom or a methyl group, $L^1$ is —COO—, $L^2$ is a divalent linking group including an alkylene group or oxyalkylene group having 2 to 12 carbon atoms, and $R^3$ is a hydrogen atom.

The polymer (B) according to the invention may include only one kind of the hydrophobic structural unit (a) represented by the formula (1), or may include two or more kinds thereof.

Exemplary monomers corresponding to a preferred hydrophobic structural unit represented by the formula (1) include benzyl acrylate, benzyl methacrylate, phenoxyethyl acrylate, phenoxyethyl methacrylate, and oligo (the number of repeating units is about 2 to 6)-ethylene glycol monophenyl ether acrylates and methacrylates. Among these, 2-phenoxyethyl acrylate and 2-phenoxyethyl methacrylate are preferred from the viewpoint of stability, storability and dischargeability, and 2-phenoxyethyl methacrylate is particularly preferred.

According to the invention, the content ratio of the hydrophobic structural unit (a) represented by the formula (1) may differ depending on the type of the aromatic ring, but is preferably from 25% by mass to less than 83% by mass, more preferably from 30% by mass to less than 80% by mass, particularly preferably from 40% by mass to less than 75% by mass, based on the total mass of the polymer (B).

Furthermore, if the hydrophobic structural unit (a) represented by the formula (1) is a structural unit derived from phenoxyethyl acrylate or phenoxyethyl methacrylate, the total content ratio of the structural unit derived from phenoxyethyl acrylate and the structural unit derived from phenoxyethyl methacrylate in the polymer (B) is preferably from 40% by mass to 53% by mass, more preferably from 42% by mass to 53% by mass, particularly preferably from 45% by mass to 53% by mass.

(b) Hydrophilic Structural Unit

The polymer (B) according to the invention preferably contains at least one kind of hydrophilic structural unit (b), in addition to the hydrophobic structural unit (a), more preferably in an amount of less than 25% by mass with respect to the total mass of the polymer (B). Furthermore, the content ratio of the hydrophilic structural unit (b) with respect to the total mass of the polymer (B) is preferably from 2% by mass to less than 25% by mass, more preferably from 5% by mass to 22 by mass, even more preferably from 5% by mass to 20% by mass.

The hydrophilic structural unit is not particularly limited as long as it includes at least one kind of hydrophilic group, and the hydrophilic group may be either a nonionic group or an ionic group. According to the invention, the hydrophilic group preferably includes at least one kind of ionic group from the viewpoint of stability, storability and dischargeability, more preferably at least one kind of ionic group selected from a carboxyl group, a phosphoric acid group or a sulfonic acid group, even more preferably a carboxyl group.

The hydrophilic structural unit (b) containing an ionic group may be formed by polymerizing an ionic group-containing monomer, but may also be formed by introducing an ionic group to a polymer chain not having an ionic group after polymerizing the same.

The following are the examples of the ionic group-containing monomer that may be used in the invention, but the invention is not limited thereto.

Among the anionic group-containing monomers, examples of those containing a carboxyl group include unsaturated carboxylic acid monomers such as acrylic acid, methacrylic acid, crotonic acid, itaconic acid, maleic acid, fumaric acid and citraconic acid; as well as β-carboxyethylacrylic acid, 2-methacryloyloxymethylsuccinic acid, and the like. Examples of the sulfonic acid group-containing monomers include styrenesulfonic acid, 2-acrylamido-2-methylpropanesulfonic acid, 3-sulfopropyl (meth)acrylic acid ester, bis-(3-sulfopropyl)-itaconic acid ester, and the like. Examples of the phosphoric acid group-containing monomers include vinylphosphonic acid, vinyl phosphate, bis (methacryloxyethyl) phosphate, diphenyl-2-acryloyloxyethyl phosphate, diphenyl-2-methacryloyloxyethyl phosphate, dibutyl-2-acryloyloxyethyl phosphate, and the like.

Among these, unsaturated carboxylic acid monomers are preferred from the viewpoint of ink viscosity and dischargeability, acrylic acid and methacrylic acid are particularly preferred, and methacrylic acid being is most preferred. The ionic group-containing monomers may be used singly or as a mixture of two or more kinds.

When the polymer (B) according to the invention contains an acidic group such as a carboxyl group, the acid value of the polymer (B) is preferably from 13 mg KOH/g to 163 mg KOH/g, more preferably from 32 mg KOH/g or to 144 mg KOH/g, and most preferably from 32 mg KOH/g to 131 mg KOH/g. The acid value as used herein is defined as the mass (mg) of KOH that is necessary to completely neutralize 1 g of the polymer (B), and may be measured by a method according to the JIS standard (JIS K0070; 1992). The value measured by this method is used as the acid value in the present invention.

(c) Structural Unit

The polymer (B) according to the invention preferably further includes at least one hydrophobic structural unit (c) having a different structure from that of the hydrophobic structural unit (a) (hereinafter, also simply referred to as "structural unit (c)").

The structural unit (c) is not particularly limited as long as it has a different structure than that of the hydrophobic structural unit represented by the formula (1), which may contain an aromatic ring or may not.

The structural unit (c) may be formed from a single structural unit, or may contain two or more kinds of structural units.

When the polymer (B) contains the structural unit (c), the colorant (A) dispersed in the polymer (B) may exhibit favorable dispersibility. The details of the mechanism are not clearly known, but are presumed to be as follows. For example, the polymer (B) contains a hydrophobic structural unit (a) that mainly exhibits affinity with the colorant and a hydrophilic structural unit (b) that mainly exhibits affinity with the aqueous medium, i.e., the structural units having opposite properties to each other. If the polymer (B) is formed only from these structural units, it may be possible that the hydrophobic structural unit (a) and the hydrophilic structural unit (b) inhibit the functions of each other and, as a result, sufficient dispersibility may not be achieved. It is thought, however, that such problems may be alleviated when the polymer (B) contains a structural unit (c) that exhibits intermediate characteristics between the hydrophobic structural unit (a) and the hydrophilic structural unit (b), whereby sufficient dispersibility may be achieved.

According to the invention, when the structural unit (c) is a structural unit containing an aromatic ring, the aromatic ring may be bound to an atom that forms the main chain via a linking group, or may be directly bound to an atom forming the main chain.

The aromatic ring is preferably a substituted or unsubstituted benzene ring, or a substituted or unsubstituted naphthalene ring, and more preferably a substituted or unsubstituted benzene ring. From the viewpoint of dispersibility of the colorant (A), availability and versatility, the aromatic ring is particularly preferably an unsubstituted benzene ring. Examples of the substituent of the aromatic ring include an alkyl group, an alkyloxy group, an aryl group, an arylalkyl group, an aryloxy group, an acyl group, a halogen atom, a cyano group and a nitro group, among which an aryl group, an arylakyl group, an aryloxy group and an acyl group are preferred.

The structural unit (c) may be formed by polymerizing a monomer having a corresponding structure. It is also possible to form the structural unit (c) by introducing a hydrophobic functional group to a polymer chain after polymerizing the polymer.

The monomer that forms the structural unit (c) is not particularly limited, as long as it has a hydrophobic functional group and a functional group capable of forming a copolymer with the hydrophobic structural unit (a) and the hydrophilic structural unit (b), and any known monomers may be used without any particular limitation.

Preferred examples of the monomer that can form the structural unit (c) include, from the viewpoint of availability, handleability and versatility, vinyl monomers such as (meth) acrylates, (meth)acrylamides, styrenes and vinyl esters.

Examples of the (meth)acrylates include alkyl (meth)acrylates such as methyl (meth)acrylate, ethyl (meth)acrylate, (iso)propyl (meth)acrylate, (iso or tertiary)butyl (meth)acrylate, 2-ethylhexyl (meth)acrylate, (iso)octyl (meth)acrylate, (iso)decyl (meth)acrylate, and (iso)stearyl (meth)acrylate. Among these, $C_1$-$C_6$ alkyl esters of (meth)acrylic acid are preferred, and $C_1$-$C_4$ alkyl esters are more preferred.

Examples of the (meth)acrylamides include (meth)acrylamides such as N-methyl (meth)acrylamide, N-ethyl (meth) acrylamide, N-propyl (meth)acrylamide, N-isopropyl (meth) acrylamide, N-n-butylacryl(meth)amide, N-t-butyl (meth) acrylamide, N-cyclohexyl (meth)acrylamide, N-(2-methoxyethyl)(meth)acrylamide, N,N-dimethyl (meth) acrylamide, N,N-diethyl (meth)acrylamide, vinyl (meth) acrylamide, N,N-diallyl (meth)acrylamide, and N-allyl (meth)acrylamide. Among these, (meth)acrylamide and N,N-dimethyl (meth)acrylamide are preferred.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected with a group that can be detached by an acidic substance (for example, t-Boc or the like), methyl vinylbenzoate, α-methylstyrene and vinylnaphthalene. Among these, styrene and α-methylstyrene are preferred.

Examples of the vinyl esters include vinyl esters such as vinyl acetate, vinyl chloroacetate, vinyl propionate, vinyl butyrate, vinyl methoxyacetate, and vinyl benzoate. Among these, vinyl acetate is preferred.

The structural unit (c) according to the invention is preferably a $C_1$-$C_6$ alkyl ester of (meth)acrylic acid (ester formed from an alcohol having 1 to 6 carbon atoms and (meth)acrylic acid), particularly preferably a structural unit derived from a $C_1$-$C_4$ alkyl ester, from the viewpoint of stability, storability and dischargeability. Among these, a structural unit derived from methyl acrylate, methyl methacrylate, ethyl acrylate or ethyl methacrylate is more preferred, and a structural unit derived from methyl methacrylate is most preferred.

The polymer (B) according to the invention may be a random copolymer in which structural units of different kinds are introduced in a random manner, or may be a block copolymer in which structural units of different kinds are introduced in a regular manner. The block copolymer may include the structural units in any sequence of introduction, and components of the same kind may be used two or more times in succession. However, the polymer (B) is preferably a random copolymer from the viewpoint of versatility and production suitability.

From the viewpoint of fixability and color saturation, the polymer (B) according to the invention preferably includes from 30 to 80% by mass of a hydrophobic structural unit represented by the formula (1) in which $R^1$ represents a hydrogen atom or a methyl group, $L^1$ represents —COO—, $L^2$ represents a divalent linking group having 2 to 20 carbon atoms, and $R^3$ represents a hydrogen atom; from 5 to 22% by mass of an anionic hydrophilic structural unit; and a structural unit derived from a $C_1$-$C_6$ alkyl ester of (meth)acrylic acid. More preferably, the polymer (B) includes from 40 to 75% by mass of a hydrophobic structural unit represented by the formula (1) in which $R^1$ represents a hydrogen atom or a methyl group, $L^1$ represents —COO—, $L^2$ represents a divalent linking group containing an alkylene group or an oxyalkylene group having 2 to 12 carbon atoms, and $R^3$ represents a hydrogen atom; from 5 to 20% by mass of an anionic hydrophilic structural unit; and a structural unit derived from a $C_1$-$C_4$ alkyl ester of (meth)acrylic acid.

Furthermore, from the viewpoint of stability, storability and dischargeability, the polymer (B) according to the invention preferably includes from 30 to 80% by mass of a structural unit derived from a monomer selected from benzyl (meth)acrylate, phenoxyethyl (meth)acrylate or an oligo (the number of repeating units being about 2 to 6)-ethylene glycol monophenyl ether (meth)acrylate; an anionic hydrophilic structural unit; and a structural unit derived from a $C_1$-$C_6$ alkyl ester of (meth)acrylic acid, and has an acid value of from 13 to 163 mg KOH/g. More preferably, the polymer (B) contains from 40 to 75% by mass of a structural unit derived from a monomer selected from phenoxyethyl (meth)acrylate or an oligo (the number of repeating units being about 2 to 6)-ethylene glycol monophenyl ether (meth)acrylates; an anionic hydrophilic structural unit; and a structural unit derived from a $C_1$-$C_4$ alkyl ester of (meth)acrylic acid, and has an acid value of from 32 to 144 mg KOH/g.

The molecular weight of the polymer (B) used in the invention is preferably in the range of from 10,000 to 300,000, more preferably in the range of from 20,000 to 200,000, and most preferably in the range of from 30,000 to 100,000, in terms of the weight average molecular weight (Mw).

The polymer (B) preferably has a molecular weight within the range described above, since a favorable steric repulsion effect of the polymer as a dispersant is likely to be achieved, and the time required for the adsorption to the colorant is likely to be reduced due to the steric effect. When the molecular weight is 100,000 or less, viscosity of the solution may become difficult to increase, thereby making it easy for handling the same. When the molecular weight is 30,000 or more, temporal stability may increase.

The molecular weight distribution (weight average molecular weight (Mw)/number average molecular weight (Mn)) of the polymer used in the invention is preferably from 1 to 6, more preferably from 1 to 4.

When the molecular weight distribution is within the range described above, the time for dispersing the pigment may be reduced and temporal stability of the dispersion may be achieved. In the invention, the values of the number average molecular weight and the weight average molecular weight are molecular weights detected by a GPC analyzer, using columns (TSKGEL GMHxL, TSKGEL G4000HxL and TSKGEL G2000HxL, trade names, manufactured by Tosoh Corp.), tetrahydrofuran (THF) as a solvent, and a differential refractometer, and calculated relative to polystyrene standards as a reference material.

The polymer used in the invention may be synthesized by various polymerization methods such as, for example, solution polymerization, precipitation polymerization, suspension polymerization, bulk polymerization and emulsion polymerization. The polymerization reaction may be carried out by a known operation such as a batch operation, a semi-continuous operation, a continuous operation, or the like.

The initiation of polymerization may be carried out by a method of using a radical initiator, a method of exposing to light or radiation, or the like. These methods for polymerization or polymerization initiation are described in, for example, "Polymer Synthesis Methods", Teiji Tsuruta, Revised Edition, published by the Nikkan Kogyo Shimbun, Ltd., 1971; and "Experimental Methods in Polymer Synthesis", co-authored by Takayki Ootsu and Masaetsu Takayuki, published by Kagaku-Dojin Publishing Company, Inc., 1972, pages 124 to 154.

Among the polymerization methods described above, a solution polymerization method in which a radical initiator is used is particularly preferred. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol. These solvents may be used singly or as a mixture of two or more kinds, or as a mixed solvent with water.

The polymerization temperature is set in accordance with the molecular weight of the produced polymer, the type of the initiator, or the like. The polymerization temperature is usually from about 0 to about 100° C., but the polymerization is preferably carried out at a temperature in the range of from 50 to 100° C.

The reaction pressure may be appropriately selected, but typically preferably from 1 to 100 kg/cm², and particularly preferably from about 1 to 30 kg/cm². The reaction time is from about 5 to 30 hours. The obtained polymer may be subjected to purification by performing reprecipitation or the like.

The following are specific examples of the polymer (B) preferably used in the invention, but the invention is not limited thereto.

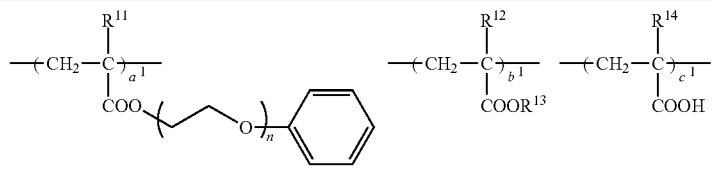

|  | $R^{11}$ | $R^{12}$ | $R^{13}$ | $R^{14}$ | n | $a^1$ | $b^1$ | $c^1$ | Mw | Mw/Mn | Acid value [mgKOH/g] |
|---|---|---|---|---|---|---|---|---|---|---|---|
| B-1 | $CH_3$ | $CH_3$ | $CH_3$ | $CH_3$ | 1 | 50 | 45 | 5 | 41,000 | 2.65 | 32.6 |
| B-2 | $CH_3$ | $CH_3$ | $CH_3$ | $CH_3$ | 1 | 50 | 42 | 8 | 41,500 | 2.63 | 52.1 |
| B-3 | $CH_3$ | $CH_3$ | $CH_3$ | $CH_3$ | 1 | 50 | 39 | 11 | 41,200 | 2.66 | 71.7 |
| B-4 | $CH_3$ | $CH_3$ | $CH_3$ | $CH_3$ | 1 | 50 | 35 | 15 | 41,500 | 2.67 | 97.8 |
| B-5 | $CH_3$ | $CH_3$ | $CH_3$ | $CH_3$ | 1 | 50 | 31 | 19 | 41,300 | 2.68 | 123.8 |
| B-6 | $CH_3$ | $CH_3$ | $CH_3$ | $CH_3$ | 1 | 50 | 30 | 20 | 42,000 | 2.69 | 130.4 |
| B-7 | $CH_3$ | $CH_3$ | $CH_3$ | $CH_3$ | 1 | 50 | 25 | 25 | 42,200 | 2.68 | 162.9 |
| B-8 | $CH_3$ | $CH_3$ | $CH_3$ | $CH_3$ | 1 | 50 | 39 | 11 | 17,000 | 2.31 | 71.7 |
| B-9 | $CH_3$ | $CH_3$ | $CH_3$ | $CH_3$ | 1 | 50 | 39 | 11 | 33,000 | 2.45 | 71.7 |
| B-10 | $CH_3$ | $CH_3$ | $CH_3$ | $CH_3$ | 1 | 50 | 39 | 11 | 50,100 | 2.67 | 71.7 |
| B-11 | $CH_3$ | $CH_3$ | $CH_3$ | $CH_3$ | 1 | 50 | 39 | 11 | 98,500 | 2.89 | 71.7 |
| B-12 | $CH_3$ | $CH_3$ | $CH_3$ | $CH_3$ | 1 | 50 | 38 | 12 | 32,000 | 2.43 | 78.2 |
| B-13 | $CH_3$ | $CH_3$ | $CH_3$ | $CH_3$ | 1 | 50 | 38 | 12 | 57,300 | 2.77 | 78.2 |
| B-14 | $CH_3$ | $CH_3$ | $CH_3$ | $CH_3$ | 1 | 50 | 38 | 12 | 96,000 | 2.89 | 78.2 |
| B-15 | $CH_3$ | $CH_3$ | $CH_3$ | $CH_3$ | 1 | 30 | 59 | 11 | 40,200 | 2.69 | 71.7 |
| B-16 | $CH_3$ | $CH_3$ | $CH_3$ | $CH_3$ | 1 | 40 | 49 | 11 | 40,500 | 2.66 | 71.7 |
| B-17 | $CH_3$ | $CH_3$ | $CH_3$ | $CH_3$ | 1 | 60 | 29 | 11 | 42,500 | 2.59 | 71.7 |
| B-18 | $CH_3$ | $CH_3$ | $C_2H_5$ | $CH_3$ | 1 | 50 | 39 | 11 | 40,400 | 2.59 | 71.7 |
| B-19 | $CH_3$ | $CH_3$ | $CH_3$ | H | 1 | 50 | 39 | 11 | 40,200 | 2.57 | 85.7 |
| B-20 | $CH_3$ | H | $CH_3$ | $CH_3$ | 1 | 50 | 38 | 12 | 41,100 | 2.51 | 78.2 |
| B-21 | $CH_3$ | H | $CH_3$ | H | 1 | 50 | 39 | 11 | 40,800 | 2.58 | 85.7 |
| B-22 | $CH_3$ | H | $C_2H_5$ | $CH_3$ | 1 | 50 | 38 | 12 | 42,200 | 2.61 | 78.2 |
| B-23 | $CH_3$ | H | $C_2H_5$ | H | 1 | 50 | 39 | 11 | 40,700 | 2.57 | 85.7 |
| B-24 | H | $CH_3$ | $CH_3$ | $CH_3$ | 1 | 50 | 38 | 12 | 40,200 | 2.53 | 78.2 |
| B-25 | H | $CH_3$ | $C_2H_5$ | $CH_3$ | 1 | 50 | 38 | 12 | 43,100 | 2.65 | 78.2 |
| B-26 | H | $CH_3$ | $CH_3$ | H | 1 | 50 | 39 | 11 | 40,300 | 2.58 | 85.7 |
| B-27 | H | H | $CH_3$ | $CH_3$ | 1 | 50 | 38 | 12 | 41,400 | 2.61 | 78.2 |

-continued

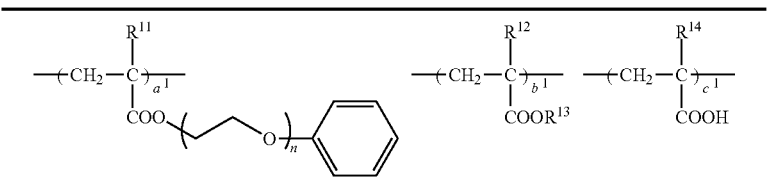

| | $R^{11}$ | $R^{12}$ | $R^{13}$ | $R^{14}$ | n | $a^1$ | $b^1$ | $c^1$ | Mw | Mw/Mn | Acid value [mgKOH/g] |
|---|---|---|---|---|---|---|---|---|---|---|---|
| B-28 | H | H | $CH_3$ | H | 1 | 50 | 39 | 11 | 40,800 | 2.57 | 85.7 |
| B-29 | H | H | $C_2H_5$ | $CH_3$ | 1 | 50 | 38 | 12 | 40,200 | 2.55 | 78.2 |
| B-30 | H | H | $C_2H_5$ | H | 1 | 50 | 39 | 11 | 40,100 | 2.53 | 85.7 |
| B-31 | $CH_3$ | $CH_3$ | $CH_3$ | $CH_3$ | 2 | 50 | 39 | 11 | 41,200 | 2.66 | 71.7 |
| B-32 | $CH_3$ | $CH_3$ | $CH_3$ | $CH_3$ | 4 | 50 | 39 | 11 | 40,200 | 2.87 | 71.7 |

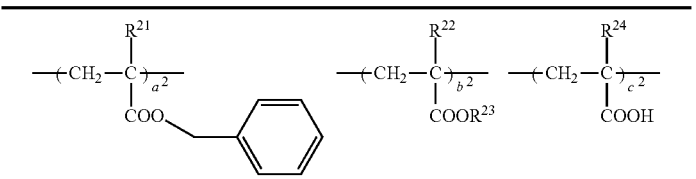

| | $R^{21}$ | $R^{22}$ | $R^{23}$ | $R^{24}$ | $a^2$ | $b^2$ | $c^2$ | Mw | Mw/Mn | Acid value [mgKOH/g] |
|---|---|---|---|---|---|---|---|---|---|---|
| B-33 | $CH_3$ | $CH_3$ | $CH_3$ | $CH_3$ | 50 | 42 | 8 | 41,200 | 2.63 | 52.1 |
| B-34 | $CH_3$ | $CH_3$ | $CH_3$ | $CH_3$ | 50 | 39 | 11 | 41,000 | 2.66 | 71.7 |
| B-35 | $CH_3$ | $CH_3$ | $CH_3$ | $CH_3$ | 50 | 35 | 15 | 41,500 | 2.65 | 97.8 |
| B-36 | $CH_3$ | $CH_3$ | $CH_3$ | $CH_3$ | 50 | 30 | 20 | 42,100 | 2.69 | 130.4 |
| B-37 | $CH_3$ | $CH_3$ | $CH_3$ | H | 50 | 39 | 11 | 40,000 | 2.3 | 85.7 |
| B-38 | $CH_3$ | H | $CH_3$ | H | 50 | 39 | 11 | 40,200 | 2.58 | 85.7 |
| B-39 | $CH_3$ | H | $C_2H_5$ | H | 50 | 39 | 11 | 40,500 | 2.57 | 85.7 |
| B-40 | H | $CH_3$ | $CH_3$ | $CH_3$ | 50 | 38 | 12 | 41,200 | 2.63 | 78.2 |
| B-41 | H | $CH_3$ | $C_2H_5$ | $CH_3$ | 50 | 38 | 12 | 42,100 | 2.62 | 78.2 |
| B-42 | H | $CH_3$ | $CH_3$ | H | 50 | 39 | 11 | 40,100 | 2.51 | 85.7 |
| B-43 | H | H | $CH_3$ | $CH_3$ | 50 | 38 | 12 | 41,400 | 2.65 | 78.2 |
| B-44 | H | H | $CH_3$ | H | 50 | 39 | 11 | 40,300 | 2.57 | 85.7 |
| B-45 | H | H | $C_2H_5$ | $CH_3$ | 50 | 38 | 12 | 40,100 | 2.53 | 78.2 |
| B-46 | H | H | $C_2H_5$ | H | 50 | 39 | 11 | 40,000 | 2.49 | 85.7 |

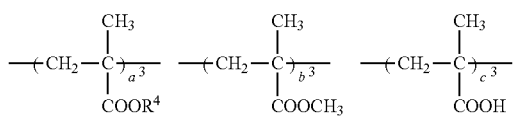

| | $R^4$ | $a^3$ | $b^3$ | $c^3$ | Mw | Mw/Mn | Acid value [mgKOH/g] |
|---|---|---|---|---|---|---|---|
| B-47 | —$(CH_2)_2$—O—C$_6$H$_4$—C$_6$H$_5$ | 50 | 39 | 11 | 40,500 | 2.55 | 71.7 |
| B-48 | —$(CH_2)_2$—O—$CH(CH_2COOBn)_2$ | 50 | 39 | 11 | 40,200 | 2.54 | 71.7 |
| B-49 | —$(CH_2)_2$—O—$CPh_3$ | 40 | 49 | 11 | 30,200 | 2.34 | 71.7 |

-continued $$-(CH_2-\underset{\underset{COOR^4}{|}}{\overset{\overset{CH_3}{|}}{C}})_{a^3}- \quad -(CH_2-\underset{\underset{COOCH_3}{|}}{\overset{\overset{CH_3}{|}}{C}})_{b^3}- \quad -(CH_2-\underset{\underset{COOH}{|}}{\overset{\overset{CH_3}{|}}{C}})_{c^3}-$$

| | $R^4$ | $a^3$ | $b^3$ | $c^3$ | Mw | Mw/Mn | Acid value [mgKOH/g] |
|---|---|---|---|---|---|---|---|
| B-50 | (structure with OH, ether, phenyl) | 50 | 39 | 11 | 73,000 | 2.78 | 71.7 |
| B-51 | (structure with OH, benzophenone) | 50 | 39 | 11 | 43,000 | 2.73 | 71.7 |
| B-52 | (structure with Cl-phenyl ether) | 50 | 39 | 11 | 43,000 | 2.68 | 71.7 |
| B-53 | (biphenyl structure) | 40 | 49 | 11 | 32,000 | 2.36 | 71.7 |
| B-54 | (diphenylmethane structure) | 45 | 40 | 15 | 41,000 | 2.48 | 97.8 |

$$-(CH_2-\underset{\underset{R^5}{|}}{\overset{\overset{CH_3}{|}}{C}})_{a^4}- \quad -(CH_2-\underset{\underset{COOCH_3}{|}}{\overset{\overset{CH_3}{|}}{C}})_{b^4}- \quad -(CH_2-\underset{\underset{COOH}{|}}{\overset{\overset{CH_3}{|}}{C}})_{c^4}-$$

| | $R^5$ | $a^4$ | $b^4$ | $c^4$ | Mw | Mw/Mn | Acid value [mgKOH/g] |
|---|---|---|---|---|---|---|---|
| B-55 | (diester diphenyl ether structure) | 50 | 39 | 11 | 43,000 | 2.68 | 71.7 |
| B-56 | (imide/diamide benzoyl structure) | 50 | 39 | 11 | 40,200 | 2.68 | 71.7 |

The content ratio of the polymer according to the invention is not particularly limited, but the mixing ratio with respect to the colorant (colorant:polymer, on a mass basis) is preferably in the range of from 1:0.06 to 1:3, more preferably in the range of from 1:0.125 to 1:2, yet more preferably in the range of from 1:0.125 to 1:1.5.

According to the invention, the colorant is preferably dispersed by the polymer to form a dispersion of colored particles. The colored particles may be produced as a dispersion by a method including, for example, a step of adding an aqueous solution containing a basic substance to a mixture of the colorant, the polymer and an organic solvent in which the polymer can be dissolved or dispersed (mixing and hydration step), and then a step of eliminating the organic solvent (solvent removal step). In this way, a dispersion of colored particles that includes the colorant finely dispersed therein and exhibits excellent storage stability may be produced.

It is necessary that the organic solvent can dissolve or disperse the polymer, but more preferably, the organic solvent has a certain degree of affinity to water. Specifically, a solvent having a solubility in water at 20° C. of from 10% by mass to 50% by mass, is preferred.

More specifically, the dispersion of colored particles may be produced by a production method including the following steps (1) and (2), but the production method is not limited thereto.

Step (1): dispersing a mixture containing a colorant, a polymer and an organic solvent capable of dissolving or dispersing the polymer, together with a solution containing a basic substance and containing water as a main component.

Step (2): eliminating at least a portion of the organic solvent.

In the step (1), a mixture is obtained by dissolving or dispersing a polymer in an organic solvent (mixing step). Subsequently, a colorant, a solution containing a basic substance and containing water as a main component, water, and optionally a surfactant or the like are added to the mixture, and the resultant is subjected to mixing and dispersion treatment. An oil-in-water dispersion is thus obtained.

The basic substance is used for neutralizing the anionic group (preferably, a carboxyl group) that may be included in the polymer. The degree of neutralization of the anionic group is not particularly limited. Typically, the dispersion of colored particles obtained as a final product preferably has a pH of, for example, from 4.5 to 10. The pH may also be determined based on the desired degree of neutralization of the polymer.

The colorant, polymer and other additives used in the method for producing a dispersion of colorant particles may be the same as those described in the above section concerning the colorant particles, and preferred examples thereof are also the same.

Preferred examples of the organic solvent include alcohol-based solvents, ketone-based solvents, and ether-based solvents. Among these, alcohol-based solvents include ethanol, isopropanol, n-butanol, tertiary butanol, isobutanol and diacetone alcohol. Ketone-based solvents include acetone, methyl ethyl ketone, diethyl ketone, and methyl isobutyl ketone. Ether-based solvents include dibutyl ether, tetrahydrofuran and dioxane. Among these solvents, isopropanol, acetone and methyl ethyl ketone are preferred, and methyl ethyl ketone is particularly preferred. The organic solvents may be used singly, or may be used in combination of plural kinds.

The dispersion of colored particles may be produced by carrying out a kneading-dispersion treatment while applying a strong shear force, using a double-roll mill, a triple-roll mill, a ball mill, a tron mill, a Disper, a kneader, a co-kneader, a homogenizer, a blender, a single-screw or twin-screw extruder or the like. The details about kneading and dispersion are described in T. C. Patton, "Paint Flow and Pigment Dispersion" (1964, published by John Wiley and Sons, Inc.), and the like.

Furthermore, as necessary, the dispersion may be subjected to a microdispersion treatment using beads having a particle size of from 0.01 to 1 mm formed from glass, zirconia or the like, by using a vertical or horizontal sand grinder, a pin mill, a slit mill, an ultrasonic disperser or the like.

The method of removing of the organic solvent in the method for producing a dispersion of colored particles according to the invention is not particularly limited, and may be a known method such as distillation under reduced pressure.

The volume average particle size of the colored particles according to the invention is preferably from 10 nm to less than 200 nm, more preferably from 50 nm to less than 130 nm, yet more preferably from 60 nm to less than 100 nm. When the volume average particle size is within the range described above, favorable color forming properties, dispersion stability and discharge stability in an inkjet method may be achieved. The volume average particle size of the colored particles described in the present specification is measured by a dynamic light scattering method.

(C) Polymerization Initiator

The aqueous ink composition of the invention contains at least one kind of polymerization initiator (C).

The polymerization initiator may be either a thermal polymerization initiator or a photopolymerization initiator, but a photopolymerization initiator is preferred. Furthermore, the polymerization initiator may be either a water-insoluble polymerization initiator in the form of an aqueous dispersion, or a water-soluble polymerization initiator, but a water-soluble polymerization initiator is preferably used.

In the present specification, being water-soluble indicates that the polymerization initiator dissolves in distilled water at 25° C. in an amount of 0.5% by mass or more. The water-soluble polymerization initiator preferably dissolves in distilled water at 25° C. in an amount of 1% by mass or more, more preferably in an amount of 3% by mass or more.

Examples of the polymerization initiator include acetophenones, α-aminoketones, benzophenones, alkylphenones, benzyls, benzoins, benzoin ethers, benzyl dialkyl ketals, thioxanthones, acylphosphine oxides, metal complexes, p-dialkylaminobenzoic acid, azo compounds, and peroxide compounds. Among them, acetophenones, α-aminoketones, benzyls, benzoin ethers, benzyl dialkyl ketals, thioxanthones, and acylphosphine oxides are preferred, and α-aminoketones, acylphosphine oxides, and alkylphenones are more preferred.

Examples of the compounds categorized as an α-aminoketone include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)-butanone-1.

There are also available commercially marketed products such as the IRGACURE series manufactured by BASF Japan Inc., for example, IRGACURE 907, IRGACURE 369, IRGACURE 379, and the like, and these products are also compounds that are categorized as an α-aminoketone, and may be suitably used for the invention.

Specific examples of the compounds that are categorized as an acylphosphine oxide include 2,4,6-trimethylbenzoyl-diphenyl-phosphine oxide, bis(2,4,6-trimethylbenzoyl)-phenylphosphine oxide, and the like.

Specific examples of the compounds that are categorized as an alkylphenone include 2,2-dimethoxy-1,2-diphenylethan-1-1-one, 1-hydroxy-cyclohexyl phenyl ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methylpropane-1, and the like. These compounds are also available as commercially marketed products such as the IRGACURE series manufactured by BASF Japan Inc., for example, IRGACURE 651, IRGACURE 184, IRGACURE 1173, IRGACURE 2959, IRGACURE 127, and the like, and may be suitably used for the invention.

Further examples of the photopolymerization initiator include the photopolymerization initiators described in Kiyomi Kato, "Ultraviolet Curing System" (published by Sogo Gijutsu Center, 1988), pages 65 to 148, and the like. These initiators may be used singly or in combination of two or more kinds, and these initiators may also be used together with a sensitizer.

The photopolymerization initiator preferably does not cause thermal decomposition at a temperature of up to 80° C. It is not preferred to use an initiator that causes thermal decomposition at a temperature of 80° C. or less, since problems occur in terms of production storage.

The polymerization initiator (C) according to the invention may be used singly, or in combination of two or more kinds.

The content ratio of the polymerization initiator (C) in the aqueous ink composition of the invention is preferably from 0.1 to 7% by mass, more preferably from 0.3 to 5% by mass, based on the total amount of the aqueous ink composition.

The content of the polymerization initiator (C) in the aqueous ink composition of the invention, with respect to the 100 parts by mass of the polymerizable compound (D) having an ethylenically unsaturated bond that will be described below, is preferably from 0.01 to 35 parts by mass, more preferably from 0.1 to 30 parts by mass, still more preferably from 0.5 to 30 parts by mass. The content of the polymerization initiator as mentioned herein indicates the total content of the polymerization initiators.

(D) Polymerizable Compound Having Ethylenically Unsaturated Bond

The ink composition of the invention contains at least one kind of polymerizable compound (D) having an ethylenically unsaturated double bond. The polymerizable compound (D) having an ethylenically unsaturated double bond may be a water-insoluble compound or a water-soluble compound, but a water-soluble polymerizable compound having an ethylenically unsaturated double bond (hereinafter, may be referred to as "specific polymerizable compound") is preferred.

The specific polymerizable compound may be any compound having, in the molecule, at least one ethylenically unsaturated bond that can undergo radical polymerization, and the specific polymerizable compound includes compounds in the chemical form of a monomer, an oligomer, a polymer or the like. The specific polymerizable compound may be used singly, or two or more kinds of compounds may be used together at an arbitrary ratio in order to enhance the desired characteristics. Preferably, it is desirable to use two or more kinds of compounds in combination, in view of controlling the performances such as reactivity and properties. Furthermore, from the viewpoint of discharge stability of the ink, it is preferable to use a compound that is highly soluble in water and is difficult to precipitate in an aqueous ink composition.

The specific polymerizable compound used in the invention is a compound that dissolves in distilled water at 25° C. at a proportion of 2% by mass or more. However, the compound preferably dissolves at a proportion of 15% by mass or more, particularly preferably uniformly mixes with water at an arbitrary proportion.

Examples of the specific polymerizable compound include unsaturated carboxylic acids such as acrylic acid, methacrylic acid, itaconic acid, crotonic acid, isocrotonic acid and maleic acid; ester derivatives of these unsaturated carboxylic acids, and amide derivatives or salts of these unsaturated carboxylic acids; anhydrides having an ethylenically unsaturated group, acrylonitrile, styrene, other unsaturated polyesters of various kinds, unsaturated polyethers, unsaturated polyamides, unsaturated urethanes, vinyl ethers, and allyl ethers. Among them, the specific polymerizable compound is preferably at least one selected from acrylic acid and methacrylic acid, ester derivatives thereof, amide derivatives thereof, and salts thereof, and more preferably at least one selected from monoesters of acrylic acid and monoesters of methacrylic acid (hereinafter, may be referred to as "monoacrylates"), esters of acrylic acid and a polyol compound, and esters of methacrylic acid and a polyol compound (hereinafter, may be referred to as "polyfunctional acrylate monomers" or "polyfunctional acrylate oligomers"), acrylamides and methacrylamides, and derivatives thereof.

In order to impart water-solubility, the specific polymerizable compound used in the invention preferably has a poly(ethyleneoxy) chain, a poly(propyleneoxy) chain, an ionic group (for example, a carboxyl group, a sulfo group or the like), or a hydroxy group. If the specific polymerizable compound has a poly(ethyleneoxy) chain or a poly(propyleneoxy) chain, the number of the ethyleneoxy unit or the propyleneoxy unit is preferably in the range of from 1 to 10, more preferably in the range of from 1 to 5. When the number of the unit is 10 or less, hardness of the film obtained by curing, adhesiveness to a recording medium, or the like may be enhanced.

In order to further improve sensitivity, bleeding, or adhesiveness to a recording medium, it is preferable to use at least one monoacrylate in combination with a polyfunctional acrylate monomer or a polyfunctional acrylate oligomer having a molecular weight of 400 or more, preferably 500 or more, as the specific polymerizable compound. In particular, when an ink composition is used for recording on a flexible recording medium such as a PET film or a PP film, it is preferred to use the combination of a monoacrylate and a polyfunctional acrylate monomer or a polyfunctional acrylate oligomer selected from the above group of compounds, since flexibility can be imparted to the film formed from the ink composition so that the film can adhere to the recording medium more tightly, and the film strength can be increased.

Furthermore, it is more preferred to employ an aspect of using at least three kinds of specific polymerizable compounds, including a monofunctional monomer, a difunctional monomer and a polyfunctional (tri- or higher-functional) monomer, from the viewpoint of further improving sensitivity, bleeding or adhesiveness to a recording medium while securing safety.

Particularly preferred specific examples of the specific polymerizable compound include compounds having the following structures, but the specific polymerizable compound used in the invention is not limited thereto.

Exemplary Compound 2-1

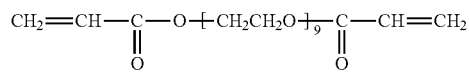

Exemplary Compound 2-2

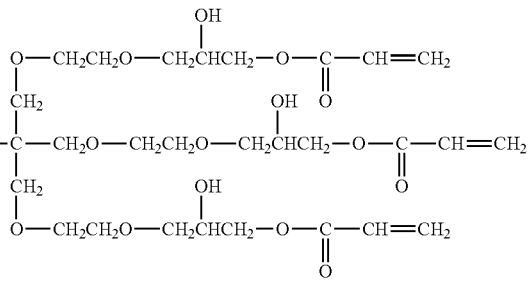

Exemplary Compound 2-4

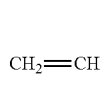

Exemplary Compound 2-4

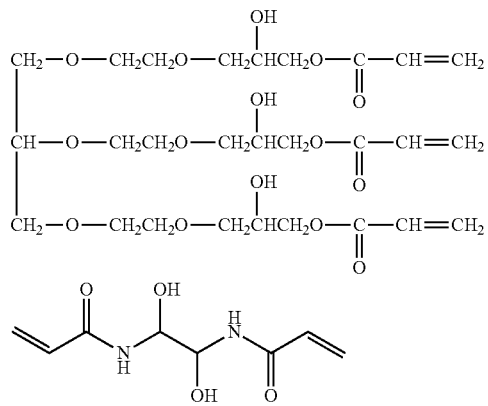

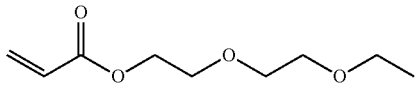

Exemplary Compound 2-5

In addition to the above exemplary compounds, a compound having an ionic group, such as a potassium salt of methacrylic acid or 3-sulfopropylacrylate, may also be preferably used.

The content ratio of the polymerizable compound (D) having an ethylenically unsaturated bond in the aqueous ink composition according to the invention is preferably from 1 to 30% by mass, and more preferably from 5 to 20% by mass, based on the total amount of the aqueous ink composition.

(E) Water

Water that is not containing ionic impurities, such as ion-exchanged water or distilled water, is preferably used as a main solvent for the aqueous ink composition according to the invention.

The content ratio of water in the aqueous ink composition according to the invention may be appropriately selected according to purposes, but is typically preferably from 10 to 95% by mass, more preferably from 30 to 90% by mass.

(Organic Solvent)

The aqueous ink composition of the invention contains water as a solvent, but preferably further contains at least one kind of organic solvent. By including an organic solvent, non-volatility may be imparted to the aqueous ink composition, the viscosity thereof may be decreased, and the wettability thereof with respect to a recording medium may be increased.

The organic solvent is used for the purpose of functioning as an anti-drying agent, a wetting agent, a penetration promoting agent or the like.

The anti-drying agent may effectively prevent clogging of nozzles that is caused by drying of the ink at ink discharge ports. The ant-drying agent is preferably a water-soluble organic solvent having a lower vapor pressure than that of water.

Specific examples of the anti-drying agent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of polyhydric alcohols, such as ethylene glycol monomethyl (or ethyl)ether, diethylene glycol monomethyl (or ethyl)ether, and triethylene glycol monoethyl (or butyl)ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; polyfunctional compounds such as diacetone alcohol and diethanolamine; and urea derivatives. Among them, polyhydric alcohols such as glycerin and diethylene glycol are preferred as the anti-drying agent. The anti-drying agents mentioned above may be used singly, or may be used in combination of two or more kinds.

The penetration promoting agent is suitably used for the purpose of facilitating penetration of the ink composition into a recording medium (printing paper).

Specific examples of the penetration promoting agent that may be suitably used include alcohols such as ethanol, isopropanol, butanol, di(tri)ethylene glycol monobutyl ether and 1,2-hexanediol, sodium lauryl sulfate, sodium oleate, and nonionic surfactants. Furthermore, it is preferable to use the penetration promoting agent in an amount that does not cause spread of printed images and paper slipping (print-through).

The water-soluble organic solvent may also be used for adjustment of viscosity, in addition to the aforementioned purposes. Specific examples of the water-soluble organic solvent that may be used for adjustment of viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

According to the invention, the organic solvent is preferably selected from glycerin, ethylene glycol, diethylene glycol and a mixture thereof, in view of excellent performances achieved by these compounds also in terms of inkjet recording suitability.

According to the invention, the organic solvent is typically preferably contained at a proportion of from 0.5 to 5% by mass, with respect to the total amount of the aqueous ink composition.

The content ratio of water in the aqueous ink composition according to the invention may be appropriately selected according to purposes, but is typically preferably from 10 to 95% by mass, more preferably from 30 to 90% by mass.

(Surface Tension Adjusting Agent)

The aqueous ink composition according to the invention preferably contains at least one kind of surface tension adjusting agent. When the ink composition contains the surface tension adjusting agent, the surface tension may be appropriately adjusted in accordance with the image forming method. For example, when the aqueous ink composition is used in an inkjet recording method, the surface tension of the aqueous ink composition may be optimized from the viewpoint of balancing its curing with its penetration, so that an image with high quality and high density can be formed particularly on ordinary paper media.

Examples of the surface tension adjusting agent include nonionic, cationic, anionic and betaine surfactants. The surface tension adjusting agent is preferably added in an amount at which the surface tension of the ink according to the invention is adjusted to from 20 to 60 mN/m, more preferably from 20 to 45 mN/m, yet more preferably to from 25 to 40 mN/m, in order to perform favorable discharge in inkjet recording.

As the surfactant according to the invention, a compound having a structure having both a hydrophilic moiety and a hydrophobic moiety in the molecule, or the like, may be effectively used, and any of an anionic surfactant, a cationic surfactant, an amphoteric surfactant and a nonionic surfactant may be used. A polymeric compound (for example, a polymeric dispersant) may also be used as a surfactant.

Specific examples of the anionic surfactant include sodium dodecyl benzenesulfonate, sodium lauryl sulfate, sodium alkyl diphenyl ether disulfonate, sodium alkyl naphthalenesulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl ether sulfate, sodium polyoxyethylene alkyl phenyl ether sulfate, sodium dialkyl sulfosuccinate, sodium stearate, sodium oleate, and t-octylphenoxyethoxy polyethoxyethyl sulfuric acid sodium salt. One or more kinds of anionic surfactant may be selected from these compounds.

Specific examples of the nonionic surfactant include polyoxyethylene lauryl ether, polyoxyethylene octyl phenyl ether, polyoxyethylene oleyl phenyl ether, polyoxyethylene nonyl phenyl ether, an oxyethylene-oxypropylene block copolymer, t-octylphenoxyethyl polyethoxyethanol, and nonylphenoxyethyl polyethoxyethanol, as well as acetylene glycol-based surfactants (for example, SURFYNOL series (trade name, manufactured by Air Products & Chemicals, Inc.) and OLFINE series (manufactured by Nissin Chemical Industry, Co., Ltd.) One or more kinds of nonionic surfactant may be selected from these compounds.

Examples of the cationic surfactant include a tetraalkylammonium salt, an alkylamine salt, a benzalkonium salt, an alkylpyridium salt and an imidazolium salt, and specific examples thereof include dihydroxyethylstearylamine, 2-heptadecenyl-hydroxyethylimidazoline, lauryldimethyl-benzylammonium chloride, cetylpyridinium chloride, and stearamidomethylpyridium chloride.

The amount of the surfactant to be added to the aqueous ink composition is not particularly limited, but preferably 1% by mass or more, more preferably from 1 to 10% by mass, yet more preferably from 1 to 3% by mass.

(Resin Particles)

The aqueous ink composition according to the invention may further contain resin particles for the purpose of increasing the fixability and scratch resistance of the printed material. Examples of the resin particles that may be used in the invention include particles of an acrylic resin, a vinyl acetate-based resin, a styrene-butadiene-based resin, a vinyl chloride-based resin, an acrylic-styrene-based resin, a butadiene-based resin, a styrene-based resin, a crosslinked acrylic resin, a crosslinked styrene-based resin, a benzoguanamine resin, a phenol resin, a silicone resin, an epoxy resin, a urethane-based resin, a paraffin-based resin, a fluorine-based resin, and latexes of these resins. Preferred examples include particles of an acrylic resin, an acrylic-styrene-based resin, a styrene-based resin, a crosslinked acrylic resin, and a crosslinked styrene-based resin.

The resin particles may also be used in the form of latex.

The weight average molecular weight of the resin particles is preferably from 10,000 to 200,000, more preferably from 100,000 to 200,000.

The average particle size of the resin particles is preferably in the range of from 10 nm to 1 µm, more preferably in the range of from 10 nm to 200 nm, yet more preferably in the range of from 20 nm to 100 nm, and particularly preferably in the range of from 20 nm to 50 nm.

The glass transition temperature Tg of the resin particles is preferably 30° C. or higher, more preferably 40° C. or higher, yet more preferably 50° C. or higher.

The amount of the resin particles to be added is preferably from 0.1 to 20% by mass, more preferably from 0.1 to 20% by mass, yet more preferably from 0.1 to 15% by mass, with respect to the amount of the aqueous ink composition.

The particle size distribution of the resin particles is not particularly limited, and either particles having a broad particle size distribution or particles having a monodisperse particle size distribution may be used. Furthermore, two or more kinds of resin particles having different monodisperse particle size distributions may be used in combination.

(Other Additives)

According to the invention, the radiation-curable aqueous ink composition may contain optional additives in addition to the compounds described above. Examples of such additives include a pH adjusting agent, a leveling agent, a viscosity adjusting agent, an oxidation inhibitor, a hindered amine light stabilizer (HALS), a preservative, and an antifungal agent. When the additive is used, the amount thereof is typically from 0.1 to 5% by mass with respect to the total amount of the aqueous ink composition.

When the aqueous ink composition according to the invention is used in, for example, an inkjet recording, the viscosity of the composition is preferably in the range of from 5 mPa·s to 15 mPa·s. When inkjet recording is performed by using fine nozzles with high density and high driving frequency, the upper limit of the viscosity is preferably 10 mPa·s.

The viscosity of the aqueous ink composition may be measured by, for example, using a Brookfield viscometer at 20° C.

The surface tension is preferably in the range of from 35 mN/m (dyne/cm) to 50 mN/m, in view of performing printing on ordinary paper media. In a conventional aqueous inkjet ink, the surface tension of the ink is adjusted to a level of as low as about 30 mN/m in order to suppress bleeding by allowing the ink to penetrate in a recording medium in a short time. However, in that case, image density is decreased. On the contrary, in the aqueous ink composition according to the invention, fluidity of the aqueous ink composition may be suppressed by curing. Therefore, by increasing the surface tension in order to allow the ink droplets to remain on the surface layer of the recording medium as long as possible, sufficient suppression of bleeding and sufficient image density may be achieved at the same time.

In order to secure the image density, it is necessary that the recording medium is wet by the ink droplets to a certain extent during performing irradiation. Accordingly, it is more preferable that the upper limit of the surface tension be about 50 mN/m.

The surface tension of the aqueous ink composition may be measured by, for example, a plate method at 25° C.

<Image Forming Method>

The image forming method according to the invention includes a step of applying the aqueous ink composition onto a recording medium, and a step of irradiating the aqueous ink composition applied onto the recording medium, with active radiation, and also other steps as necessary.

By performing the method as described above, an image having high print density and having excellent glossiness, scratch resistance, fixability and marker resistance may be formed.

The method of forming an image by applying the aqueous ink composition according to the invention on a recording medium is not particularly limited, and any known image forming method may be used. For example, there are methods of applying the aqueous ink composition onto a recording medium by means of an inkjet system, a mimeograph system, a press transfer system, or the like. Among them, an image forming method including a step of applying the aqueous ink composition of the invention by an inkjet system is preferred, from the viewpoint of reducing the size of the recording apparatus and performing printing at high speed.

(Inkjet System)

The recording of an image by an inkjet system may be carried out by, specifically, applying energy to a liquid composition to discharge the same onto a desired recording medium, such as ordinary paper, resin-coated paper, inkjet recording paper used exclusively for inkjet recording such as those described in, for example, JP-A Nos. 8-169172, 8-27693, 2-276670, 7-276789, 9-323475, 62-238783, 10-153989, 10-217473, 10-235995, 10-337947 and 10-217597, films, paper for common use for general purpose and electrophotography, cloth, glass, metal, or ceramics. Furthermore, an inkjet system described in paragraphs [0093] to [0105] of JP-A No. 2003-306623 may also be applied to the invention.

The inkjet system is not particularly limited, and may be any known system such as, for example, a charge control system in which ink is discharged by utilizing electrostatic attraction force; a drop-on-demand system in which a vibration pressure of a piezo element is utilized (pressure pulse system); an acoustic inkjet system in which electric signals are converted to acoustic beams, and ink is irradiated with the acoustic beams, whereby the ink is discharged by radiation pressure; and a thermal inkjet (BUBBLEJET (registered trademark)) system in which ink is heated to form air bubbles and the generated pressure is utilized.

The inkjet head used in these inkjet systems may either an on-demand system or a continuous system. The ink nozzles and the like, which are used when performing recording by the inkjet methods described above, are also not particularly limited and may be appropriately selected in accordance with the intended use.

The inkjet method also includes a system in which ink having a low color density, which is called photo-ink, is discharged in a large number of droplets having a small volume; a system in which inks of the substantially same color hue but having different densities are used in order to improve the image quality; or a system in which a colorless transparent ink is used.

The inkjet method may employ a shuttle system in which a short serial head is used for recording by scanning the same in a width direction of the recording medium; or a line system in which a line head, including recording elements arranged so as to cover the whole length corresponding to one side of the recording medium, is used. In the line system, image recording may be performed by scanning the entire surface of the recording medium with the line head, in a direction perpendicular to the direction in which the recording elements are arranged. Accordingly, in the line system, a delivery system such as a carriage along which the short head performs scanning is not required. Furthermore, since only the recording medium is moved without the need of carrying out a complicated process of controlling the scan movement of the carriage and the recording medium, the recording speed can be improved as compared with the shuttle system.

The image forming method of the invention includes a step of irradiating the aqueous ink composition, which has been applied onto a recording medium, with active radiation. By irradiating the ink with active radiation, the polymerizable compound in the aqueous ink composition polymerizes and forms a cured film containing a colorant.

The active radiation used in the invention is not particularly limited, as long as the polymerizable compound can be polymerized by applying the same. Examples thereof include ultraviolet rays and electron beams, and among them, ultraviolet rays are preferred from the viewpoint of versatility.

(Ultraviolet Irradiation Lamp)

The means for performing ultraviolet irradiation may be a conventionally used unit, particularly preferably an ultraviolet irradiation lamp.

The ultraviolet irradiation lamp is preferably a lamp that exhibits a vapor pressure of mercury of from 1 to 10 Pa when emitting light, such as a low-pressure mercury lamp, a high-pressure mercury lamp, or a mercury lamp coated with a fluorescent substance. The emission spectrum in an ultraviolet region of these mercury lamps is in the region of 450 nm or less, and particularly in the range of from 184 nm to 450 nm, which is suitable for efficiently causing reaction of the polymerizable compound included in a black or colored aqueous ink composition. The ultraviolet irradiation lamp is also suitable when a power supply is mounted in the printer, since a small-sized power source can be used. Examples of the mercury lamp that are being put into actual use include a metal halide lamp, a high-pressure mercury lamp, an ultrahigh-pressure mercury lamp, a xenon flash lamp, a deep-UV lamp, a lamp that that excites a mercury lamp from an external source by using microwaves without an electrode, and UV laser beam. Since the emission wavelength regions of these lamps include the wavelength range mentioned above, any of these lamps are basically applicable as long as the power supply size, power input intensity, lamp shape or the like is acceptable. The light source is selected also in view of the sensitivity of the polymerization initiator.

The necessary intensity of ultraviolet radiation is preferably from 500 to 5000 mW/cm$^2$ in the region of a wavelength that is effective for curing. When the irradiation intensity is weak, an image having high quality and toughness may not be formed. Furthermore, when the irradiation intensity is too strong, the recording medium may be damaged, or color fading of the colorant may occur.

The following are exemplary embodiments of the present invention. However, the present invention is not limited thereto.

1. An aqueous ink composition comprising a colorant, a polymer comprising a hydrophobic structural unit (a) represented by the following formula (1), a polymerization initiator, a polymerizable compound comprising an ethylenically unsaturated bond, and water:

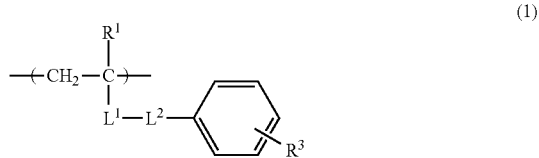

(1)

wherein, in formula (1), R$^1$ represents a hydrogen atom, a methyl group or a halogen atom; L$^1$ represents —COO—, —COO—, —CONR$^2$—, —O—, or a substituted or unsubstituted phenylene group; R$^2$ represents a hydrogen atom or an alkyl group having 1 to 10 carbon atoms; L$^2$ represents a single bond or a divalent linking group having 1 to 30 carbon atoms; and R$^3$ represents a hydrogen atom, a hydroxy group, an alkyl group, an alkyloxy group, an aryl group, an arylalkyl group, an aryloxy group, an acyl group, a halogen atom, a cyano group, or a nitro group.

2. The aqueous ink composition according to 1, wherein the polymer further comprises a hydrophilic structural unit (b) at a proportion of less than 25% by mass with respect to a total mass of the polymer.

3. The aqueous ink composition according to 1, wherein the polymer further comprises a hydrophobic structural unit (c) derived from an alkyl ester of acrylic acid or methacrylic acid having 1 to 6 carbon atoms.

4. The aqueous ink composition according to 2, wherein the polymer further comprises a hydrophobic structural unit (c) derived from an alkyl ester of acrylic acid or methacrylic acid having 1 to 6 carbon atoms.

5. The aqueous ink composition according to 1, wherein L$^2$ in formula (1) represents a divalent linking group having 2 to 30 carbon atoms.

6. The aqueous ink composition according to 1, wherein R$^3$ in formula (1) represents a hydrogen atom.

7. The aqueous ink composition according to 2, wherein the hydrophilic structural unit (b) has at least one selected from the group consisting of a carboxyl group, a phosphoric acid group and a sulfonic acid group.

8. The aqueous ink composition according to 2, wherein the hydrophilic structural unit (b) has a structural unit derived from at least one of acrylic acid or methacrylic acid.

9. The aqueous ink composition according to 1, wherein the hydrophobic structural unit (a) has a structural unit derived from at least one of phenoxyethyl acrylate or phenoxyethyl methacrylate.

10. The aqueous ink composition according to 3, wherein the structural unit (c) comprises a structural unit derived from at least one selected from the group consisting of methyl acrylate, methyl methacrylate, ethyl acrylate and ethyl methacrylate.

11. The aqueous ink composition according to 4, wherein the structural unit (c) comprises a structural unit derived from at least one selected from the group consisting of methyl acrylate, methyl methacrylate, ethyl acrylate and ethyl methacrylate.

12. The aqueous ink composition according to 1, wherein the colorant comprises a pigment.

13. The aqueous ink composition according to 1, wherein the polymerization initiator comprises a compound that is categorized as an alkylphenone.

14. Use of the aqueous ink composition according to 1 for an inkjet recording.

15. An image forming method, comprising:
    applying the aqueous ink composition according to 1 to a recording medium by an inkjet method; and
    irradiating the aqueous ink composition applied to the recording medium with active radiation.

EXAMPLES

Hereinafter, the present invention will be explained in details with reference to the Examples, but the invention is not intended to be limited to these Examples. Unless particularly stated otherwise, "parts" and "%" are on a mass basis.

Synthesis Example 1

A polymer B-3 was synthesized according to the following scheme.

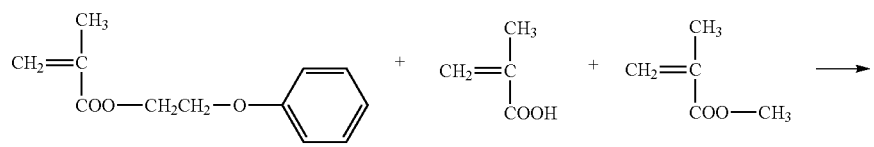

-continued

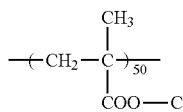

B-3

33 g of methyl ethyl ketone were added to a 500-ml three-necked flask equipped with a stirrer and a cooling tube, and heated to 75° C. under a nitrogen atmosphere. To this flask, a solution prepared by dissolving 2 g of dimethyl 2,2'-azobisisobutyrate, 50 g of phenoxyethyl methacrylate, 11 g of methacrylic acid and 39 g of methyl methacrylate in 70 g of methyl ethyl ketone, was added dropwise over 3 hours. After completion of the dropwise addition, the reaction solution was allowed to react for another hour, and then a solution prepared by dissolving 0.2 g of dimethyl 2,2'-azobisisobutyrate in 2 g of methyl ethyl ketone was added thereto. Subsequently, the reaction mixture was heated to 78° C., and heating of the reaction mixture was continued for 4 hours at the same temperature. The resulting reaction solution was subjected to reprecipitation twice in a large excess of hexane, and a polymer precipitated therefrom was dried. Thus, 95 g of a polymer B-3 were obtained.

The composition of the obtained polymer B-3 was confirmed by $^1$H-NMR, and the weight average molecular weight (Mw) determined by GPC was 41,000. The acid value of this polymer B-3 determined by a method described in the JIS standard (JIS K0070; 1992) was 71.7 mg KOH/g.

Polymers B-1, B-2, B-4, B-6 to B-11, B-18 and B-34 were respectively synthesized in the same manner as described above, except that the type and the amount of the monomers used in the synthesis of the polymer B-3 were changed to that indicated in the following Table 1 and the following chemical formula.

The molecular weight was adjusted by changing the amount of addition of dimethyl 2,2'-azobisisobutyrate as an initiator, and the acid value was adjusted by changing the ratio of the monomers.

TABLE 1

| | $R^{11}$ | $R^{12}$ | $R^{13}$ | $R^{14}$ | n | $a^1$ | $b^1$ | $c^1$ | Mw | Mw/Mn | Acid value [mgKOH/g] |
|---|---|---|---|---|---|---|---|---|---|---|---|
| B-1 | $CH_3$ | $CH_3$ | $CH_3$ | $CH_3$ | 1 | 50 | 45 | 5 | 41,000 | 2.65 | 32.6 |
| B-2 | $CH_3$ | $CH_3$ | $CH_3$ | $CH_3$ | 1 | 50 | 42 | 8 | 41,500 | 2.63 | 52.1 |
| B-3 | $CH_3$ | $CH_3$ | $CH_3$ | $CH_3$ | 1 | 50 | 39 | 11 | 41,200 | 2.66 | 71.7 |
| B-4 | $CH_3$ | $CH_3$ | $CH_3$ | $CH_3$ | 1 | 50 | 35 | 15 | 41,500 | 2.67 | 97.8 |
| B-6 | $CH_3$ | $CH_3$ | $CH_3$ | $CH_3$ | 1 | 50 | 30 | 20 | 42,000 | 2.69 | 130.4 |
| B-7 | $CH_3$ | $CH_3$ | $CH_3$ | $CH_3$ | 1 | 50 | 25 | 25 | 42,200 | 2.68 | 162.9 |
| B-8 | $CH_3$ | $CH_3$ | $CH_3$ | $CH_3$ | 1 | 50 | 39 | 11 | 17,000 | 2.31 | 71.7 |
| B-9 | $CH_3$ | $CH_3$ | $CH_3$ | $CH_3$ | 1 | 50 | 39 | 11 | 33,000 | 2.45 | 71.7 |
| B-10 | $CH_3$ | $CH_3$ | $CH_3$ | $CH_3$ | 1 | 50 | 39 | 11 | 50,100 | 2.67 | 71.7 |
| B-11 | $CH_3$ | $CH_3$ | $CH_3$ | $CH_3$ | 1 | 50 | 39 | 11 | 98,500 | 2.89 | 71.7 |
| B-18 | $CH_3$ | $CH_3$ | $C_2H_5$ | $CH_3$ | 1 | 50 | 39 | 11 | 40,400 | 2.59 | 71.7 |

B-34

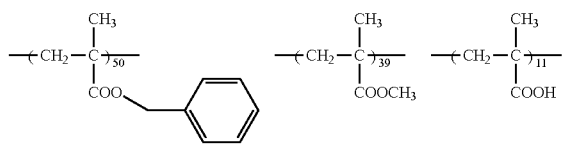

Mw: 41,000;Mw/Mn = 2.66;Acid value 71.7

Synthesis Example 2

Polymer D-1

A polymer D-1 was synthesized in accordance with a method described in paragraphs [0087] to [0089] of JP-A No. 2009-84494, as shown in the scheme given below. The composition of the obtained polymer was confirmed by $^1$H-NMR, and the weight average molecular weight (Mw) determined by GPC was 36,000. The acid value of this polymer determined by a method described in the JIS standard (JIS K0070; 1992) was 65.2 mg KOH/g.

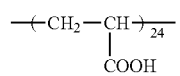

Mw = 16,200: Acid value 187.0 mg KOH/g

Preparation of Dispersion of Pigment-Containing Resin Particles (Pigment Dispersion (E-3)) 10 parts of Pigment Blue 15:3 (PB15:3, trade name: PHTHALOCYANINE BLUE A220, manufactured by Dainichiseika Color & Chemicals Manufacturing Co., Ltd.), 5 parts of a polymer

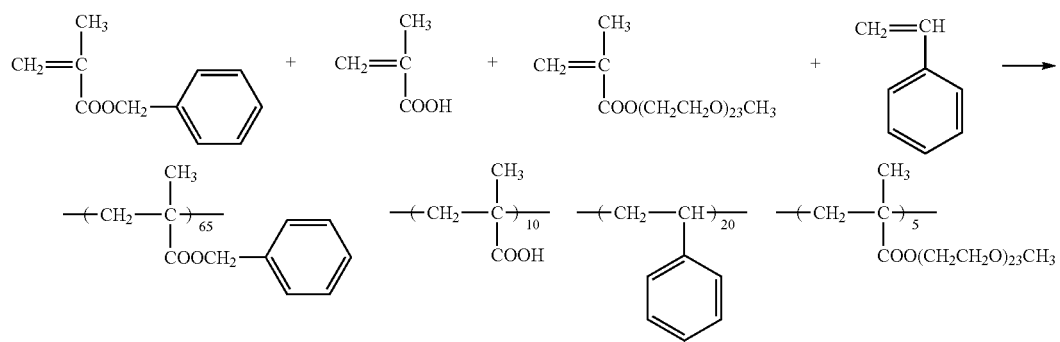

D-1

Synthesis Example 3

Comparative Polymer D-2

33 g of methyl ethyl ketone were added to a 500-ml three-necked flask equipped with a stirrer and a cooling tube, and heated to 75° C. under a nitrogen atmosphere. To this flask, a solution prepared by dissolving 8 g of dimethyl 2,2'-azobisisobutyrate, 66 g of styrene, 10 g of butyl acrylate and 24 g of acrylic acid in 70 g of methyl ethyl ketone was added dropwise over 3 hours. After the completion of the dropwise addition, the reaction solution was allowed to react for another hour, and then a solution prepared by dissolving 0.2 g of dimethyl 2,2'-azobisisobutyrate in 2 g of methyl ethyl ketone was added thereto. Subsequently, the reaction mixture was heated to 78° C., and heating of the reaction mixture was continued for 4 hours at the same temperature. The resulting reaction solution was subjected to reprecipitation twice in a large excess of hexane, and a polymer precipitated therefrom was dried. Thus, 95 g of a comparative polymer D-2 were obtained.

The composition of the obtained polymer was confirmed by $^1$H-NMR, and the weight average molecular weight (Mw) determined by GPC was 16,200. The acid value of this polymer determined by a method described in the JIS standard (JIS K0070; 1992) was 187.0 mg KOH/g.

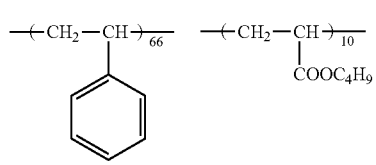

D-2 solution of the polymer B-3, 42 parts of methyl ethyl ketone, 6.2 parts of a 1 mol/L aqueous solution of NaOH, and 87.2 parts of ion-exchanged water were mixed, and this mixture was subjected to a dispersion treatment for 2 to 6 hours with a bead mill, using zirconia beads (diameter: 0.1 mm).

Methyl ethyl ketone was removed from the obtained dispersion under reduced pressure at 55° C., and a portion of water was further removed. A dispersion of pigment-containing resin particles having a pigment concentration of 10.2% was thus obtained. The dispersion was centrifuged for 30 minutes at 5000 rpm by a centrifuge (trade name: 05P-21, manufactured by Hitachi, Ltd.), and then ion-exchanged water was added to the dispersion so that the pigment concentration was 5%. This mixture was filtered under pressure using a membrane filter having a pore size of 2.5 μm (manufactured by Advantec MFS, Inc.), and then ion-exchanged water was added to the filtrate so that the pigment concentration was 4%. A pigment dispersion (E-3) was thus obtained.

Preparation of Pigment Dispersions (E-1), (E-2) and (E-4) to (E-15)

Pigment dispersions (E-1), (E-2) and (E-4) to (E-15) were respectively prepared in the same manner as in the preparation of the pigment dispersion (E-3), except that the polymers and pigments indicated in Table 2 were used in place of the polymer B-3 and Pigment Blue 15:3 used in the preparation of the pigment dispersion (E-3). The details of the pigments described in the table are as follows.

C.I. Pigment Red 122 (PR122, trade name: CROMOPHTAL JET MAGENTA DMQ, manufactured by BASF Japan Inc.)

C.I. Pigment Yellow 74 (PY74, trade name: IRGALITE YELLOW GS, manufactured by BASF Japan Inc.)

Carbon black (CB, trade name: NIPEX180-IQ, manufactured by Degussa GmbH)

Preparation of Pigment Dispersion (E-16)

A pigment dispersion (E-16) was prepared according to the method described in paragraphs [0091] to [0093] of JP-A No. 2009-84494, using the polymer D-1 and Pigment Blue 15:3.

Preparation of Pigment Dispersion (E-17)

A pigment dispersion (E-17) was prepared according to the method described in paragraph [0072] of JP-A No. 2008-247940, using carbon black (CB).

Example 1

Preparation of Aqueous Ink Composition F-3

The pigment dispersion E-3 obtained by the above process and the following components were mixed and stirred using a high-speed water-cooling stirrer. An aqueous ink composition F-3 according to the invention was thus obtained.

—Ink Composition—

| | |
|---|---|
| Pigment dispersion E-3 | 33 parts |
| Polymerizable compound: Exemplary compound 2-1 | 18 parts |
| Polymerizable compound: Exemplary compound 2-4 | 2 parts |
| Polymerization initiator: IRGACURE 2959 | 3 parts |
| OLFINE E1010 | 1 part |
| Ion-exchanged water | 43 parts |

Example 2

Preparation of Aqueous Ink Compositions F-1, F-2 and F-4 to F-13

Aqueous ink compositions F-1, F-2 and F-4 to F-13 of the invention were respectively prepared in the same manner as in the preparation of the aqueous ink composition F-3 of Example 1, except that the pigment dispersions E-1, E-2 and E-4 to E-12 were used in place of the pigment dispersion E-3 used in Example 1.

Comparative Example 1

Preparation of Aqueous Ink Composition F-16

An aqueous ink composition F-16 was prepared according to the method described in paragraph [0095] of JP-A No. 2009-84494, using the pigment dispersion E-16.

Comparative Example 2

Preparation of Aqueous Ink Composition F-17

An aqueous ink composition F-17 was prepared in the same manner as in Example 1, except that the pigment dispersion E-17 obtained as described above was used in place of the pigment dispersion E-3 used in Example 1.

<Image Formation and Evaluation>

A solid image and characters were formed on a recording medium (FX-L, trade name, manufactured by Fuji Xerox Co., Ltd.) as a recording medium, from the aqueous ink compositions obtained in the above processes, using an inkjet recording apparatus (trade name: PX-G930, manufactured by Seiko Epson Corp.) Then, a sample printed material was obtained by exposing the printed material to light emitted from an iron-doped ultraviolet lamp (power output: 120 W/cm$^2$) by conveying the printed material under the light for one second.

The obtained sample printed materials were subjected to the following evaluations. The results are presented in Table 2.

(1) Fixability

A piece of Silbon paper was placed on a surface of the sample printed material on which the solid image was formed, and the Silbon paper was pulled while applying load of 40 g/cm$^2$ thereon. Whether or not smudge was formed on the Silbon paper was determined by visual inspection, and the result was evaluated based on the following evaluation criteria.

—Evaluation Criteria—

A . . . Smudge due to rubbing was hardly seen.

B . . . A slight degree of smudge due to rubbing was seen.

C . . . A significant degree of smudge due to rubbing was seen and was problematic for practical applications.

(2) Abrasion Resistance

A portion of the sample printed material with the characters formed thereon was rubbed with an eraser for office use (trade name: MONO, manufactured by Tombow Pencil Co., Ltd.) by repeating a back-and-forth movement 10 times. The result was visually observed by ten general evaluators, and evaluated based on the following evaluation criteria.

—Evaluation Criteria—

A . . . 8 or more evaluated that the result almost maintained the original image density.

B . . . 4 to 7 evaluated that the result almost maintained the original image density.

C . . . 3 or fewer evaluated that the result almost maintained the original image density.

(3) Marker Resistance

A marking was formed on a portion of the sample printed material with the characters formed thereon with a fluorescent yellow pen (trade name: BEAMLINERS, manufactured by Zebra Pen Corp.) while applying ordinary writing pressure. Whether or not disorder in the characters occurred was visually observed, and the results were evaluated based on the following evaluation criteria.

—Evaluation Criteria—

A . . . Disorder in the characters due to marking was almost negligible.

B . . . A slight degree of disorder in the characters due to marking occurred.

C . . . A significant degree of disorder in the characters due to marking occurred.

(4) Color Saturation

The optical density at a portion of the sample printed material with the solid image formed thereon was measured by using an optical densitometer (trade name: X-RITE 938, manufactured by X-Rite, Inc.) Specifically, the values of a*b* according to the L*a*b* color system stipulated by CIE1976 were determined, and then the color saturation C* was calculated in accordance with the following expression. The results were evaluated based on the following evaluation criteria.

$$C^* = ((a^*)^2 + (b^*)^2)^{1/2} \qquad \text{(expression)}$$

—Evaluation Criteria—

A . . . The color saturation (C*) was 80 or greater.

B . . . The color saturation (C*) was from 70 to 80.

C . . . The color saturation (C*) was 69 or less.

— . . . Evaluation was not carried out.

(5) Print Density

The optical density at a portion of the sample printed material with the solid image formed thereon was measured (25° C.) using a Macbeth densitometer (product number: RD914, manufactured by Gretag Macbeth GmbH). The results were evaluated based on the following evaluation criteria.
—Evaluation Criteria—
A . . . The reflection density was 1.0 or greater.
B . . . The reflection density was less than 1.0.

TABLE 2

| Aqueous ink composition | Pigment dispersion | Polymer | | | | | Evaluation | | | | | Notes |
|---|---|---|---|---|---|---|---|---|---|---|---|---|
| | | Type | Mw | Mw/Mn | Acid value [mg KOH/g] | Pigment | Fixability | Abrasion resistance | Marker resistance | Color saturation | Print density | |
| F-1 | E-1 | B-1 | 41,000 | 2.65 | 32.6 | PB 15:3 | B | B | B | B | A | The Invention |
| F-2 | E-2 | B-2 | 41,500 | 2.63 | 52.1 | PB 15:3 | A | A | A | A | A | The Invention |
| F-3 | E-3 | B-3 | 41,200 | 2.66 | 71.7 | PB 15:3 | A | A | A | A | A | The Invention |
| F-4 | E-4 | B-3 | 41,200 | 2.66 | 71.7 | PY74 | A | A | A | A | A | The Invention |
| F-5 | E-5 | B-3 | 41,200 | 2.66 | 71.7 | CB | A | A | A | — | A | The Invention |
| F-6 | E-6 | B-3 | 41,200 | 2.66 | 71.7 | PR122 | A | A | A | A | A | The Invention |
| F-7 | E-7 | B-4 | 41,500 | 2.67 | 97.8 | PB 15:3 | A | A | A | A | A | The Invention |
| F-8 | E-8 | B-6 | 42,000 | 2.69 | 130.4 | PB 15:3 | A | A | A | A | A | The Invention |
| F-9 | E-9 | B-7 | 42,200 | 2.68 | 162.9 | PB 15:3 | A | A | A | B | A | The Invention |
| F-10 | E-10 | B-8 | 17,000 | 2.31 | 71.7 | PB 15:3 | A | A | A | A | A | The Invention |
| F-11 | E-11 | B-9 | 33,000 | 2.45 | 71.7 | PB 15:3 | A | A | A | A | A | The Invention |
| F-12 | E-12 | B-10 | 50,100 | 2.67 | 71.7 | PB 15:3 | A | A | A | A | A | The Invention |
| F-13 | E-13 | B-11 | 98,500 | 2.89 | 71.7 | PB 15:3 | A | A | A | A | A | The Invention |
| F-14 | E-14 | B-18 | 40,400 | 2.59 | 71.7 | PB 15:3 | A | A | A | A | A | The Invention |
| F-15 | E-15 | B-34 | 41,000 | 2.66 | 71.7 | PB 15:3 | B | B | B | B | A | The Invention |
| F-16 | E-16 | D-1 | 36,000 | 2.66 | 65.2 | PB 15:3 | C | C | C | B | A | Comparative |
| F-17 | E-17 | D-2 | 16,200 | 2.32 | 187.0 | PB 15:3 | B | B | B | C | B | Comparative |

As seen the results in Table 2, when the aqueous ink composition according to the invention is used, an image having high print density and having excellent color saturation, abrasion resistance, fixability and marker resistance can be formed. In particular, it is proved that aqueous inks such as F-1 to F-14, using polymers B-1 to B-18 containing phenoxyethyl methacrylate as a dispersant, exhibit even more excellent properties.

On the other hand, it is also proved that ink that does not contain a polymerizable compound, such as Comparative Example F-16, exhibits poor fixability, abrasion resistance and marker resistance, and ink using a styrene/acrylic acid/butyl acrylate copolymer (D-2) as a dispersant polymer, such as Comparative Example F-17, exhibits inferior color saturation, print density or the like.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous ink composition comprising a colorant, a polymer comprising a hydrophobic structural unit (a) represented by the following formula (1), a polymerization initiator, a polymerizable compound comprising an ethylenically unsaturated bond, and water:

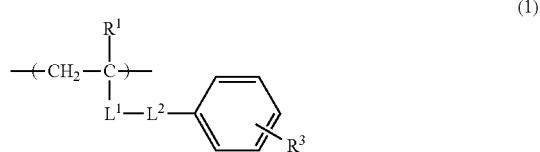

(1)

wherein, in formula (1), $R^1$ represents a hydrogen atom, a methyl group or a halogen atom; $L^1$ represents —COO—, —COO—, —CONR$^2$—, —O—, or a substituted or unsubstituted phenylene group; $R^2$ represents a hydrogen atom or an alkyl group having 1 to 10 carbon atoms; $L^2$ represents a single bond or a divalent linking group having 1 to 30 carbon atoms; and $R^3$ represents a hydrogen atom, a hydroxy group, an alkyl group, an alkyloxy group, an aryl group, an arylalkyl group, an aryloxy group, an acyl group, a halogen atom, a cyano group, or a nitro group.

2. The aqueous ink composition according to claim 1, wherein the polymer further comprises a hydrophilic structural unit (b) at a proportion of less than 25% by mass with respect to a total mass of the polymer.

3. The aqueous ink composition according to claim 2, wherein the polymer further comprises a hydrophobic structural unit (c) derived from an alkyl ester of acrylic acid or methacrylic acid having 1 to 6 carbon atoms.

4. The aqueous ink composition according to claim 3, wherein the structural unit (c) comprises a structural unit derived from at least one selected from the group consisting of methyl acrylate, methyl methacrylate, ethyl acrylate and ethyl methacrylate.

5. The aqueous ink composition according to claim 2, wherein the hydrophilic structural unit (b) has at least one selected from the group consisting of a carboxyl group, a phosphoric acid group and a sulfonic acid group.

6. The aqueous ink composition according to claim 2, wherein the hydrophilic structural unit (b) has a structural unit derived from at least one of acrylic acid or methacrylic acid.

7. The aqueous ink composition according to claim 1, wherein the polymer further comprises a hydrophobic structural unit (c) derived from an alkyl ester of acrylic acid or methacrylic acid having 1 to 6 carbon atoms.

8. The aqueous ink composition according to claim 7, wherein the structural unit (c) comprises a structural unit derived from at least one selected from the group consisting of methyl acrylate, methyl methacrylate, ethyl acrylate and ethyl methacrylate.

9. The aqueous ink composition according to claim 1, wherein $L^2$ in formula (1) represents a divalent linking group having 2 to 30 carbon atoms.

10. The aqueous ink composition according to claim 1, wherein $R^3$ in formula (1) represents a hydrogen atom.

11. The aqueous ink composition according to claim 1, wherein the hydrophobic structural unit (a) has a structural unit derived from at least one of phenoxyethyl acrylate or phenoxyethyl methacrylate.

12. The aqueous ink composition according to claim 1, wherein the colorant comprises a pigment.

13. The aqueous ink composition according to claim 1, wherein the polymerization initiator comprises a compound that is categorized as an alkylphenone.

14. Use of the aqueous ink composition according to claim 1 for an inkjet recording.

15. An image forming method, comprising:
applying the aqueous ink composition according to claim 1 to a recording medium by an inkjet method; and
irradiating the aqueous ink composition applied to the recording medium with active radiation.

* * * * *